United States Patent [19]

Kapoor et al.

[11] Patent Number: 6,113,672
[45] Date of Patent: Sep. 5, 2000

[54] MULTIPLE EQUALIZATION PRESSURE SWING ADSORPTION PROCESS

[75] Inventors: Akhilesh Kapoor, Basking Ridge; YuDong Chen, Bridgewater, both of N.J.; Ravi Kumar, Allentown, Pa.; Robert M. Thorogood, Murray Hill, N.J.; Simon Davies, Guildford, United Kingdom

[73] Assignee: The BOC Group, Inc., Murray Hill, N.J.

[21] Appl. No.: 09/234,819

[22] Filed: Jan. 21, 1999

[51] Int. Cl.[7] ................................. B01D 53/047
[52] U.S. Cl. ..................... 95/101; 95/102; 95/103; 95/105; 95/140
[58] Field of Search ............. 95/96–98, 100–105, 95/140

[56] References Cited

U.S. PATENT DOCUMENTS

| | | | |
|---|---|---|---|
| Re. 32,590 | 2/1988 | Sakuraya et al. | 95/140 X |
| 4,316,880 | 2/1982 | Jockel et al. | 95/103 X |
| 4,468,238 | 8/1984 | Matsui et al. | 95/102 |
| 4,512,780 | 4/1985 | Fuderer | 95/140 X |
| 4,705,541 | 11/1987 | Sircar | 95/98 |
| 4,726,816 | 2/1988 | Furderer | 95/98 |
| 4,834,780 | 5/1989 | Benkmann | 95/140 X |
| 4,892,565 | 1/1990 | Schmidt et al. | 95/101 |
| 4,915,711 | 4/1990 | Kumar | 95/101 |
| 5,015,272 | 5/1991 | Okada et al. | 95/100 X |
| 5,026,406 | 6/1991 | Kumar | 95/101 |
| 5,042,995 | 8/1991 | Mitariten | 95/140 X |
| 5,106,396 | 4/1992 | Mitariten | 95/140 X |
| 5,203,888 | 4/1993 | Maurer | 95/101 |
| 5,234,472 | 8/1993 | Krishnamurthy et al. | 95/140 X |
| 5,248,322 | 9/1993 | Kumar | 95/140 X |
| 5,294,247 | 3/1994 | Scharpf et al. | 95/140 X |
| 5,354,346 | 10/1994 | Kumar | 95/140 X |
| 5,520,720 | 5/1996 | Lemcoff | 95/96 |
| 5,702,504 | 12/1997 | Schaub et al. | 95/105 X |
| 5,980,857 | 11/1999 | Kapoor et al. | 95/140 X |
| 5,993,517 | 11/1999 | Chen et al. | 95/140 X |

*Primary Examiner*—Robert H. Spitzer
*Attorney, Agent, or Firm*—Philip H. Von Neida; Salvatore P. Pace

[57] ABSTRACT

The strongly adsorbed component of a gas mixture is produced in enhanced purity and yield by novel PSA cycles. The basic steps of the cycles include an adsorption vessel prepressurization step, a cocurrent nonadsorbed gas production step, a cocurrent purge step with strongly adsorbed gas product and a countercurrent depressurization step which produces the strongly adsorbed gas product that is used in the cocurrent purge step. In addition to the basic steps, a first depressurization equalization step precedes or follows the cocurrent purge step and a corresponding first pressurization equalization step follows the countercurrent depressurization step. The cycle optionally includes one or two depressurization equalization steps before the cocurrent purge step and one or two corresponding pressurization equalization steps after the first pressurization equalization step.

31 Claims, 9 Drawing Sheets

MULTIPLE EQUALIZATION PRESSURE SWING ADSORPTION PROCESS

FIELD OF THE INVENTION

This invention relates to a pressure swing adsorption (PSA) process, and more particularly to a PSA process for recovering strongly adsorbed components of a gas stream. In particular, the invention relates to PSA adsorption cycles having multiple equalization steps which improve the purity of strongly adsorbed product streams.

BACKGROUND OF THE INVENTION

Components of gas mixtures are frequently separated from the gas mixtures by PSA. Although PSA is generally more useful when the desired component is the least strongly adsorbed component, this gas separation technique can be successfully used when the desired component is more strongly adsorbed by the selected adsorbent than are the other components of the gas mixture. For example, carbon monoxide can be separated from gas mixtures containing, in addition to carbon monoxide, hydrogen, carbon dioxide, methane and nitrogen by means of cuprous ion-containing adsorbents. Such mixtures often occur in syngas, a hydrogen and carbon monoxide mixture produced in hydrocarbon reforming processes.

PSA processes are commonly carried out in elongate vessels having an inlet end and a nonadsorbed product outlet end and which are packed with a bed of particulate material which adsorbs one or more components of the gas mixture more strongly than it adsorbs one or more other components of the gas mixture. PSA processes include the basic steps of adsorption or production and adsorbent regeneration. During the adsorption step, the gas mixture to be separated is passed cocurrently through an adsorption vessel (in the direction from the inlet end towards the nonadsorbed product outlet end) at a selected adsorption pressure. The strongly adsorbed component(s) are adsorbed from the gas mixture as it passes through the vessel, and the nonadsorbed component(s) pass out of the vessel through the nonadsorbed product outlet. During the adsorbent regeneration step, the vessel is depressurized by releasing or withdrawing (evacuating) gas countercurrently (in the direction opposite the cocurrent direction) out of the vessel. The strongly adsorbed component(s) are removed from the vessel during the adsorbent regeneration step.

In addition to the basic steps, PSA processes generally have a number of additional steps. One important step is bed equalization, in which gas discharged from an adsorption vessel upon completion of the adsorption step (equalization-depressurization) is reintroduced in the vessel (or introduced into another vessel, in the case of multivessel systems) after completion of the adsorbent regeneration step (equalization-repressurization). During equalization, the gas can be removed from a vessel via its outlet end and reintroduced into the vessel via its outlet end (outlet-to-outlet equalization) or it can be removed from the vessel via its inlet end and reintroduced into the vessel via its inlet end (inlet-to-inlet equalization) or by other combinations of these. Conventional bed equalization serves two important purposes: it saves energy by using compressed gas released from an adsorption vessel after an adsorption step to partially repressurize the vessel for the adsorption step of the following cycle of the process, and it allows recovery of valuable partially fractionated gas component.

Another step that enhances the efficiency of adsorption processes is the purge or rinse step. This step generally assists in the regeneration of the adsorbent, and it can take place before, during, or after the countercurrent depressurization step. When the primary purpose of the PSA process is to recover nonadsorbed product, the purge is carried out by passing low pressure nonadsorbed product gas countercurrently through the adsorption vessel during or after the countercurrent depressurization step. When the primary product is the strongly adsorbed component of the mixture, the purge step is carried out by passing strongly adsorbed gas cocurrently through the vessel before, during or after countercurrent depressurization of the vessel. In any event, the purge step serves to remove additional undesired component from the adsorbent by increasing the partial pressure of the desired component in the vessel, thereby causing desorption of undesired component from the adsorbent, and by flushing undesired component from the vessel.

When a PSA process is practiced to recover a strongly adsorbed component from a gas mixture and the gas mixture contains more than one component that is preferentially adsorbed by the adsorbent, it is difficult to recover the desired component in high purity and at high yield. Improvements which enhance the purity and yield of strongly adsorbed products produced in PSA processes are continually sought. The present invention provides such an improvement.

SUMMARY OF THE INVENTION

The invention provides enhanced purity and yield of the strongly adsorbed product produced in a PSA cycle by including a low pressure adsorbent bed equalization step in the cycle after the purge step of the cycle and/or one or more adsorbent bed equalization steps whose bed depressurization substeps preceed the purge step of the cycle.

According to a first broad embodiment, the invention comprises an improvement to a pressure swing adsorption process for producing second component-enriched gas from a gas mixture containing first and second components in at least one adsorption zone containing an adsorbent which selectively adsorbs the second component. The process comprises in part repeatedly performing in each adsorption zone the following sequence of basic steps:

(a) pressurizing the adsorption zone to a selected adsorption pressure;

(b) cocurrently introducing the gas mixture into the adsorption zone at the selected adsorption pressure while cocurrently removing first component-enriched gas therefrom;

(c) purging the adsorption zone by cocurrently introducing thereinto part of the second component-enriched gas produced in step (d), below, while cocurrently removing purge effluent therefrom; and (d) further depressurizing the adsorption zone by countercurrently removing second component-enriched gas therefrom.

The improvement to the above basic cycle comprises including a first additional step comprising removing a first equalization effluent from the adsorption zone between steps (c) and (d), above, and a second additional step comprising reintroducing the first equalization effluent into the adsorption zone between step (d) of one cycle of the process and step (a) of the next cycle of the process.

In a preferred aspect of the first broad embodiment, the improved process further comprises, between steps (b) and (c), above, the step of partially depressurizing the adsorption zone by cocurrently removing second component-depleted gas therefrom.

In another preferred aspect of the first broad embodiment, the process further comprises purging the adsorption zone with the second component-depleted gas between the second additional step of one cycle of the process and step (a) of the following cycle of the process.

In a preferred embodiment, the process of the broad embodiment further comprises a third additional step comprising removing a second equalization effluent from the adsorption zone between steps (b) and (c), and a fourth additional step comprising reintroducing the second equalization effluent into the adsorption zone between the second additional step of one cycle of the process and step (a) of the following cycle of the process. A preferred aspect of this preferred embodiment comprises cocurrently purging the adsorption zone with the second component-depleted gas between the second additional step and the fourth additional step, or between the fourth additional step of one cycle of the process and step (a) of the following cycle of the process.

A more preferred embodiment further comprises, between the third additional step and step (c), the step of partially depressurizing the adsorption zone by cocurrently removing second component-depleted gas therefrom.

Another more preferred embodiment further comprises, between step (b) and the third additional step, the step of partially depressurizing the adsorption zone by cocurrently removing second component-depleted gas therefrom. A preferred variation of this preferred embodiment comprises a fifth additional step comprising removing a third equalization effluent from the adsorption zone between step (b) and the step of partially depressurizing the adsorption zone, and a sixth additional step comprising reintroducing the third equalization effluent into the adsorption zone between the fourth additional step of one cycle of the process and step (a) of the following cycle of the process. A preferred aspect of this more preferred embodiment comprises cocurrently purging the adsorption zone with the second component-depleted gas between the second additional step and the fourth additional step, or between the fourth additional step and the sixth additional step or between the sixth additional step of one cycle of the process and step (a) of the following cycle of the process.

A preferred variation of the first broad embodiment comprises cocurrently purging the adsorption zone with the purge effluent immediately prior to step (c) of the process.

A second broad embodiment of the invention comprises a basic pressure swing adsorption cycle for producing second component-enriched gas from a gas mixture containing first and second components in at least one adsorption zone containing an adsorbent which selectively adsorbs the second component, comprising repeatedly performing in each adsorption zone the following sequence of steps:

(a) pressurizing the adsorption zone to a selected adsorption pressure;

(b) cocurrently introducing the gas mixture into the adsorption zone at the selected adsorption pressure while cocurrently removing first component-enriched gas therefrom;

(c) partially depressurizing the adsorption zone by cocurrently removing second component-depleted gas therefrom;

(d) purging the partially depressurized adsorption zone by cocurrently introducing thereinto second component-enriched gas produced in step (e), while cocurrently removing purge effluent therefrom; and (e) further depressurizing the adsorption zone by countercurrently removing second component-enriched gas therefrom.

The improvement of this broad embodiment comprises a first additional step comprising removing a first equalization effluent stream from the adsorption zone between steps (c) and (d) and a second additional step comprising introducing the first equalization effluent into the adsorption zone between step (e) of one cycle of the process and step (a) of the following cycle of the process.

A further improvement of the second broad embodiment comprises cocurrently purging the adsorption zone with the second component-depleted gas between the second additional step of one cycle of the process and step (a) of the following cycle of the process.

In a preferred embodiment of the second broad embodiment the cycle further includes a third additional step comprising removing a second equalization effluent gas from the adsorption zone between steps (b) and (c), thereby producing a second equalization effluent, and a fourth additional step comprising introducing the second equalization effluent into the adsorption zone between the second additional step of one cycle of the process and step (a) of the following cycle of the process. A further improvement of this preferred embodiment comprises cocurrently purging the adsorption zone with the second component-depleted gas between the second and fourth additional steps or between the fourth additional step of one cycle of the process and step (a) of the following cycle of the process.

In all embodiments, it is preferred to remove the equalization effluents from the adsorption zone in a cocurrent direction and to reintroduce the equalization effluents into the adsorption zone in a countercurrent direction.

A preferred variation of the second broad embodiment comprises pressurizing the adsorption zone prior to step (d) by cocurrently introducing second component-enriched gas into the adsorption zone between the first additional step and step (d). Another preferred variation of the second broad embodiment comprises cocurrently purging the adsorption zone with the purge effluent immediately prior to step (d) of the process.

In the above embodiments, the selected adsorption pressure is preferably in the range of about 0.5 to about 50 bara, and more preferably in the range of about 1 to about 50 bara. Likewise, during the countercurrent depressurization step (step (d) of the cycle of the first broad embodiment and step (e) of the cycle of the second broad embodiment) the pressure in the adsorption zone is reduced to about 0.1 to about 5 bara, and more preferably, the adsorption vessel is evacuated to subatmospheric pressure.

In other preferred embodiments, the first component is hydrogen, carbon dioxide, nitrogen or mixtures of these, and the second component is carbon monoxide.

The improved process of the invention is preferably carried out in a plurality of adsorption vessels arranged in parallel and operated out of phase, and more preferably carried out in four adsorption vessels.

BRIEF DESCRIPTION OF THE DRAWINGS

The same reference characters are used to represent the same steps in the various drawings.

DETAILED DESCRIPTION OF THE INVENTION

Figure 1:
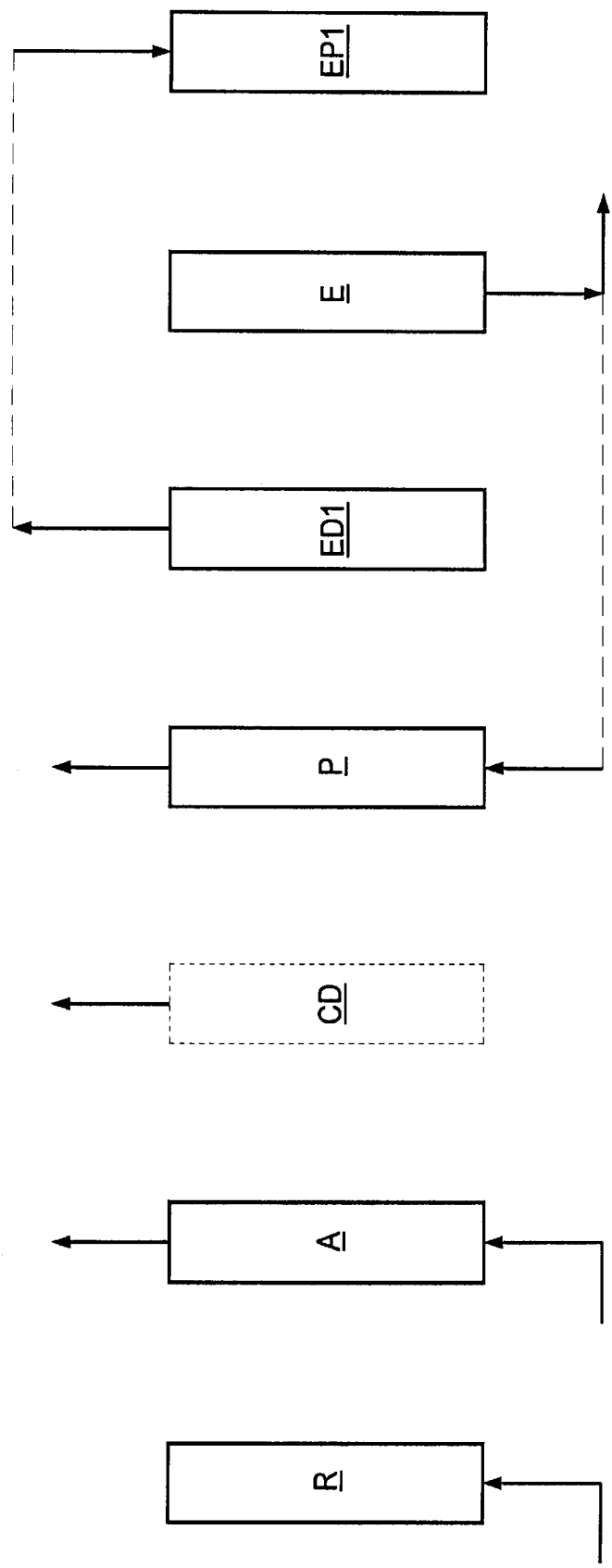
FIG. 1 illustrates a first broad embodiment of the invention comprising a PSA cycle having an equalization depressurization step after the cocurrent purge step.

Conventional PSA processes designed primarily for the recovery of the strongly adsorbed component of a gas mixture generally comprise a pressurization step, an adsorption step, a cocurrent depressurization step, a low pressure purge step and a countercurrent depressurization or production step. The process is generally carried out in one or more elongate adsorption vessels having a feed gas inlet at one end and a nonadsorbed gas outlet at the other end. The vessels are packed with adsorbent which adsorbs one component of the feed gas mixture more strongly than it adsorbs one or more other components of the gas mixture.

During the pressurization step a vessel of the system is pressurized with the feed gas mixture or with nonadsorbed gas produced in previous cycles of the process, or with a combination of these gases. When the pressure in the vessel reaches the desired adsorption pressure the adsorption step is initiated. During the adsorption step, the feed gas mixture is passed cocurrently (in the direction from the feed inlet end toward the nonadsorbed gas outlet end) through the vessel, and as this step proceeds, strongly adsorbed component is preferentially adsorbed. The strongly adsorbed component forms a front which gradually moves cocurrently through the vessel. When the front reaches a predetermined point in the vessel, which is preferably prior to breakthrough of significant amounts of strongly adsorbed product through the nonadsorbed product gas outlet, the adsorption step is terminated and the cocurrent depressurization step begins. Cocurrent depressurization serves the purpose of removing most of the nonadsorbed gas component from the vessel. During this step, gas contained in the void spaces of the adsorbent is removed cocurrently from the adsorption vessel. When the vessel is depressurized to the desired extent, the cocurrent depressurization step is terminated and the cocurrent purge step is begun. The cocurrent purge step functions to scavenge additional nonadsorbed gas component from the adsorption vessel. During cocurrent purge, strongly adsorbed product gas produced in previous adsorption cycles is passed cocurrently through the adsorption vessel. The strongly adsorbed product gas displaces less strongly adsorbed component from the adsorbent and sweeps the displaced gas and residual void space gas out of the vessel. The final step of the basic process, countercurrent depressurization, is used to produce the strongly adsorbed gas product. During this step, strongly adsorbed gas product is removed from the adsorption vessel by countercurrently (the direction opposite the cocurrent direction) depressurizing the vessel. If depressurization is conducted to subatmospheric pressure, this step is usually carried out with the aid of a vacuum pump or other evacuating means.

In spite of the fact that the vessel is purged with strongly adsorbed product gas, residual nonadsorbed gas component still remains in the adsorbent and in the adsorption vessel itself. The principal objective of this invention is to modify the above conventional process in a manner which removes nonadsorbed component from the adsorption vessel prior to the cocurrent depressurization step, thereby reducing the concentration of nonadsorbed gas component remaining in the adsorption vessel in all of the subsequent steps of the process. This objective is accomplished by including in the process a high pressure cocurrent purge step in which the effluent from the purge step which follows the cocurrent depressurization step is pressurized and passed cocurrently through the adsorption vessel immediately following the adsorption step.

The process of the invention is generally carried out in an adsorption system comprising a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the desired gas component, while one or more other units are undergoing regeneration to desorb and collect the adsorbed gas component. Operation of the adsorption systems of the invention is cyclical. In preferred embodiments of the invention, adsorption cycles are repeatedly carried out in a manner such that production of the desired product gas is substantially continuous.

The adsorbent used in the adsorption vessels will depend upon the particular gas to be separated from the gas mixture as the strongly adsorbed component. Typical adsorbents include silica gel, alumina, activated carbon, carbon molecular sieves, natural zeolites, such as mordenite, faujasite, clinoptilolite, chabazite, etc. and synthetic zeolites, such as types A, X and Y zeolites. When the strongly adsorbed gas being separated from the gas mixture is carbon monoxide, preferred adsorbents include $copper^+$-, $silver^+$-, and $palladium^{++}$-containing adsorbents of the above classes. Preferred carbon monoxide-selective adsorbents include copper ion and silver ion containing adsorbents, such as $copper^+$ salt- or $silver^+$ salt-containing alumina and $copper^+$- and $silver^+$-exchanged zeolites.

The pressure at which the adsorption step of the process is carried out is a matter of choice. Typically, the adsorption is carried out at a pressure above about 1 bar, absolute (bara). The upper pressure limit is determined by economics and limitations of the adsorption system and, in general, it is desirably about 70 bara, preferably about 20 bara and most preferably about 5 bara. The pressure at which adsorbent regeneration is carried out is likewise a matter of choice, and the minimum pressure depends upon whether or not vacuum equipment is used to withdraw adsorbed gas from the adsorption vessels. Typically, the lower pressure limit during adsorbent regeneration in vessel A can be as low as 50 mbara (millibar absolute), but is preferably not lower than about 150 mbara, and is most preferably not lower than about 200 mbara. Adsorbent regeneration may be carried out at pressures as high as 5 bara, but is preferably carried out at pressures not higher than about 2 bara, and most preferably at pressures not above about 1 bara.

Although the process may be used to separate the components of any gas mixture, it will be described in detail as it applies to the separation of carbon monoxide, as the sorbate, from a gas mixture comprised of hydrogen, carbon monoxide, carbon dioxide, methane and nitrogen. Also, the process will be described as taking place in a single vessel undergoing a series of steps, but, generally it is more convenient to practice the process in an adsorption system comprised of two or more vessels.

A clear understanding of the invention is provided by the following description taken together with the appended drawings. Turning now to the drawings, and particularly to FIG. 1, there is illustrated therein a series of steps comprising a broad embodiment of the invention. The steps of one conventional version of the process are those labled R, A, CD, P and E. Step R is the pressurization step, when the cycle is the initial cycle of a run, or a repressurization step, for the second and subsequent cycles of the run. A stands for the adsorption step, CD represents the cocurrent depressurization step, P stands for the purge step and E stands for the countercurrent depressurization or evacuation step. In broader versions of the process, steps CD and P can be carried out in the countercurrent direction, although this is less preferred. Step CD is also shown in dashed form to indicate that this step, although important in preferred embodiments of the invention, is optional in the embodiment illustrated in FIG. 1. As can be seen from FIG. 1, step E is used to produce the strongly adsorbed product and to provide the purge gas for purge step P. The line connecting the inlet end of the adsorption vessel in steps E and P is dashed to indicate that in a single vessel system the gas goes indirectly from the strongly adsorbed outlet of the adsorption vessel in step E to the inlet of the adsorption vessel in step P. In single vessel systems, the purge gas usually comes from a strongly adsorbed gas product storage vessel.

The novel steps of the process illustrated in FIG. 1 are steps ED1 and EP1. Together these steps constitute a pressure equalization procedure. ED1 stands for equalization depressurization 1 and EP1 stands for equalization pressurization 1. A dashed line connects the outlet end of the adsorption vessel to indicate that these steps are not contemporaneous in a single adsorption vessel system. In single vessel systems the equalization gas from the adsorption vessel to a storage vessel during step ED1 and from the storage vessel to the adsorption vessel in step EP1. The equalization step is represented in FIG. 1 as taking place between the nonadsorbed outlet ends of the vessel (outlet-to-outlet equalization). Although this is the preferred method of equalization, other equalization techniques, such as inlet-to-inlet, outlet to inlet or inlet-to-inlet/outlet-to-outlet equalization methods can be employed.

The advantage provided by conducting the equalization step after the purge step results because of the high concentration of strongly adsorbed product gas in the purge stream causes additional nonadsorbed (or weakly adsorbed) gas components (impurities) to be desorbed from the adsorbent during the purge step. Conducting the equalization step after the purge step results in the removal of additional gas impurities from the vessel prior to the countercurrent depressurization step, thus enhancing the purity of the strongly adsorbed product gas, and also results in the transfer of strongly adsorbed gas-rich gas removed from the adsorption vessel during step ED1 back into the adsorption vessel during step EP1, thus avoiding loss of strongly adsorbed product gas during the equalization step.

The pressure in the adsorption vessel decreases as the cycle proceeds from step A to step E, and it increases as the cycle proceeds from step E to step A. Thus, step ED1 reduces the pressure in the adsorption vessel from the pressure at which the purge step is carried out to the pressure at which step E begins. Step EP1 serves to partially repressurize the adsorption vessel. In some preferred embodiments steps ED1, E and EP1 are carried out at subatmospheric pressures.

When the cocurrent depressurization is eliminated from the above cycle, its function is performed by the purge step. In such cases the purge step can be carried out at any desired pressure between the adsorption pressure and the pressure at which step ED1 is carried out. Furthermore, when the cocurrent depressurization step is eliminated, the pressure in the adsorption vessel can be reduced over the course of the purge step.

Figure 2:
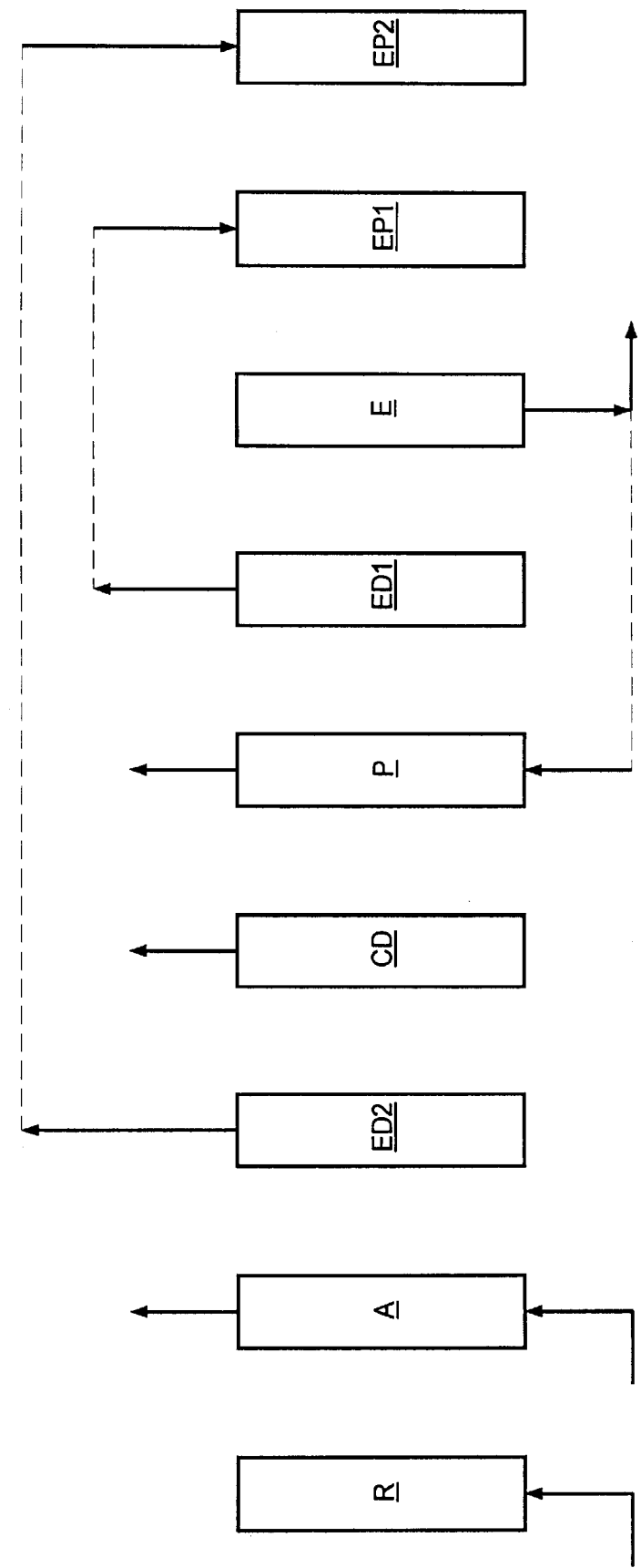
FIG. 2 illustrates a variation of the embodiment illustrated in FIG. 1, comprising a PSA cycle having two equalization steps.

An alternative broad embodiment of the invention is illustrated in FIG. 2. The FIG. 2 process is similar to that of FIG. 1, except that in the FIG. 2 process, step CD is required and the equalization-depressurization step, step ED2, is carried out before the purge step. The second part of the equalization step, step EP2, is substantially identical to step EP1 of the FIG. 1 process. Step CD in the FIG. 2 process serves to remove gas mixture that is relatively depleted in strongly adsorbed component, and Step ED2 serves to recover some of the strongly adsorbed component that is normally discharged from the system in the FIG. 1 process.

Figure 3:
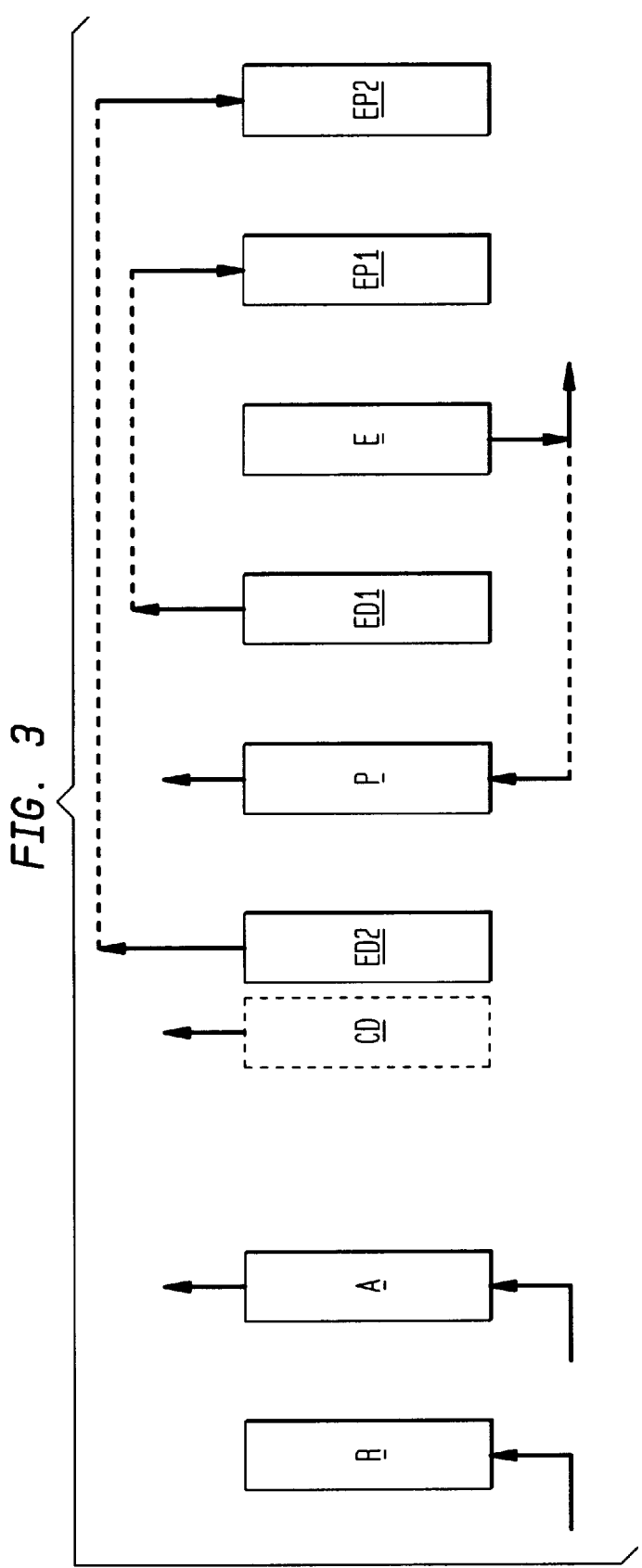
FIG. 3 illustrates another variation of the embodiment illustrated in FIG. 1, comprising a PSA cycle having two equalization steps.

The process illustrated in FIG. 3 is a modification of the FIG. 1 process wherein the cycle includes an additional equalization procedure, comprising steps ED2 and EP2. The principal purpose of the additional equalization is to preserve some of the energy pressure that is lost during step CD of the FIG. 1 process. Step EP3 follows step EP1 in the cycle, since the gas introduced into the adsorption vessel during step EP3 is greater than the pressure in the vessel at the end of step EP1. Step CD is optional in the FIG. 3 process.

Figure 4:
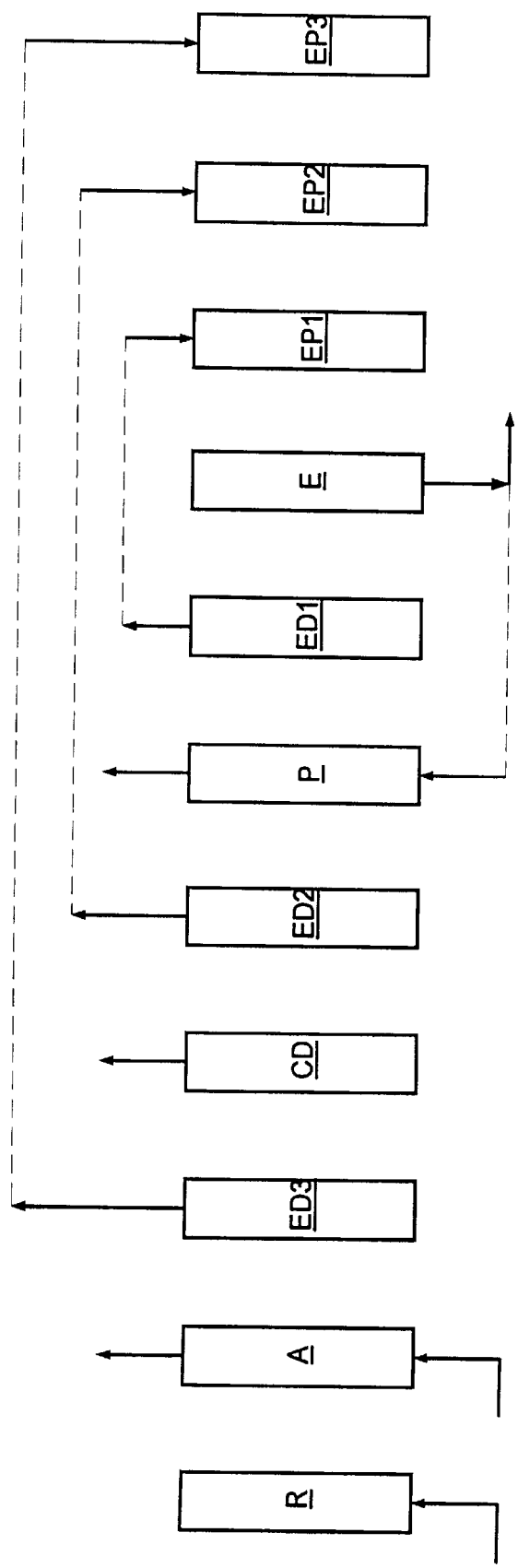
FIG. 4 illustrates a preferred variation of the embodiment illustrated in FIG. 1, comprising a PSA cycle having three equalization steps.

The process shown in FIG. 4 is another modification of the FIG. 1 process. The FIG. 4 process is a combination of the processes of FIGS. 1 and 2. The ED2/EP2 equalization procedure does not preserve as much pressure energy as the ED3/EP3 equalization procedure, but the gas transferred during the ED2/EP2 procedure is richer in strongly adsorbed component than the gas transferred during the ED3/EP3 procedure, since it comes from the bottom section of the adsorption vessel. Step EP2 follows step EP1 in the cycle since the pressure in the adsorption vessel at the beginning of step EP2 is greater than the pressure in the vessel at the end of step EP1. Step CD is required in the FIG. 4 process to distinguish this process from the process of the FIG. 3 embodiment that does not include step CD.

Figure 5:
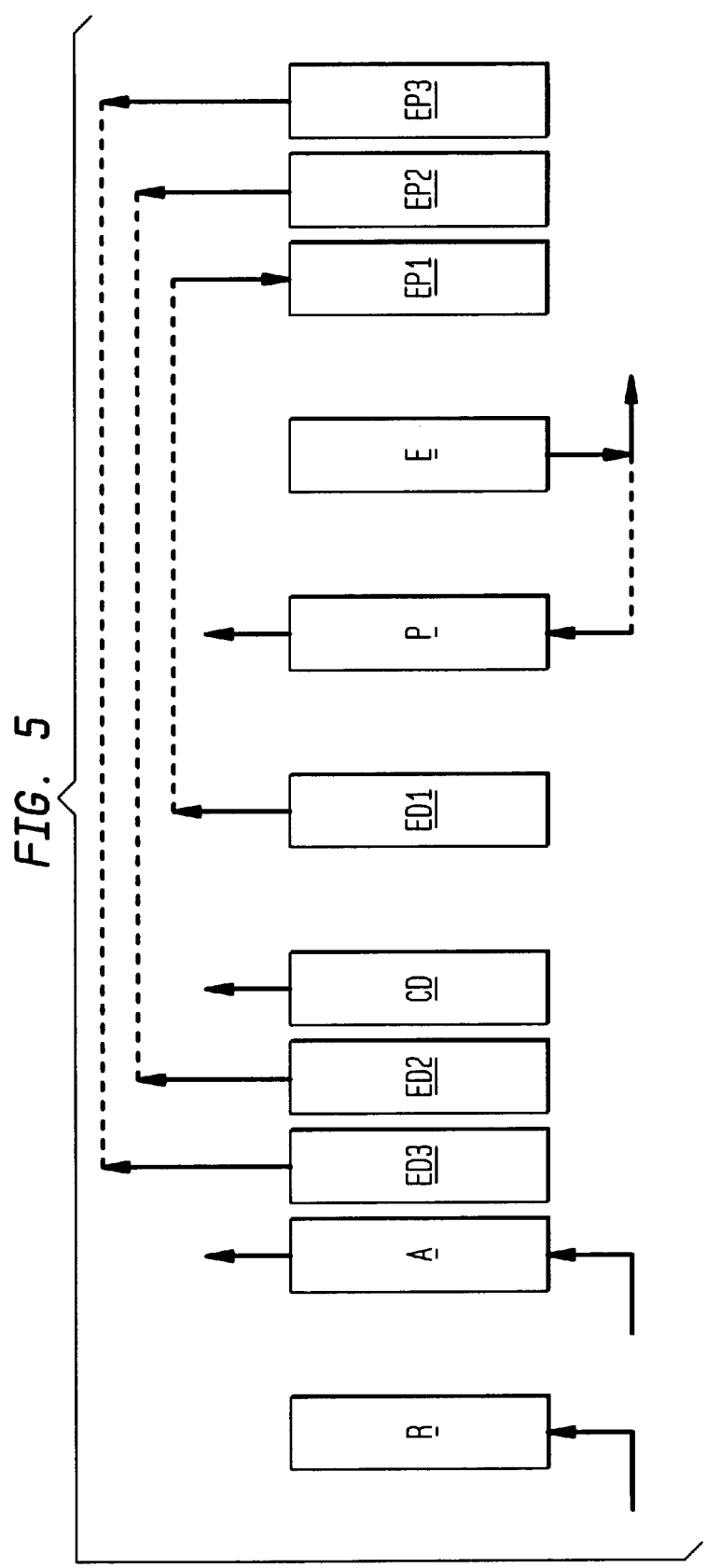
FIG. 5 illustrates a second broad embodiment of the invention comprising a PSA cycle having an equalization depressurization step before the cocurrent purge step.

The FIG. 5 process is a modification of the FIG. 2 process. As was the case in the FIG. 3 process, the FIG. 5 process serves primarily to preserve some of the energy pressure that would be lost in step CD if steps ED3/EP3 were not included in the cycle. Step EP3 follows step EP2 in the cycle since the pressure in the adsorption vessel at the beginning of step EP3 is greater than the pressure in the vessel at the end of step EP2. Step CD is required in the FIG. 5 process.

Figure 6:
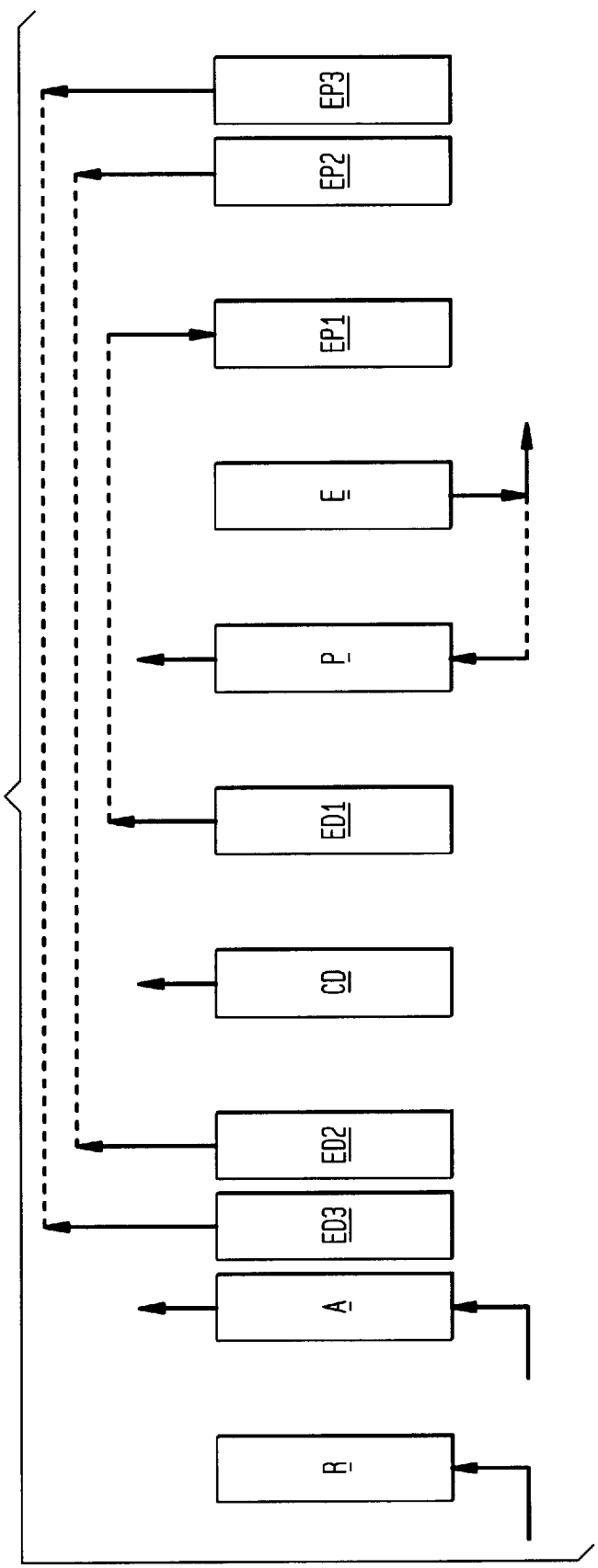
FIG. 6 illustrates a variation of the embodiment illustrated in FIG. 5, comprising a PSA cycle having two equalization steps.

The process of FIG. 6 is more preferred than the processes illustrated in FIGS. 1–4, since it incorporates all of the advantages of the FIGS. 1–4 processes into a single process. Thus, the FIG. 6 process includes the strongly adsorbed product purification benefit of the FIG. 1 process, and the pressure energy saving benefit of the process of FIG. 5. Steps EP1, EP2 and EP3 occur in the order shown in FIG. 6, since the pressure on the adsorption vessel at the beginning of step EP2 is greater than the pressure in the vessel at the end of step EP1, and the pressure in the adsorption vessel at the beginning of step EP3 is greater than the pressure in the vessel at the end of step EP2. Step CD is required in the FIG. 6 process.

Figure 7:
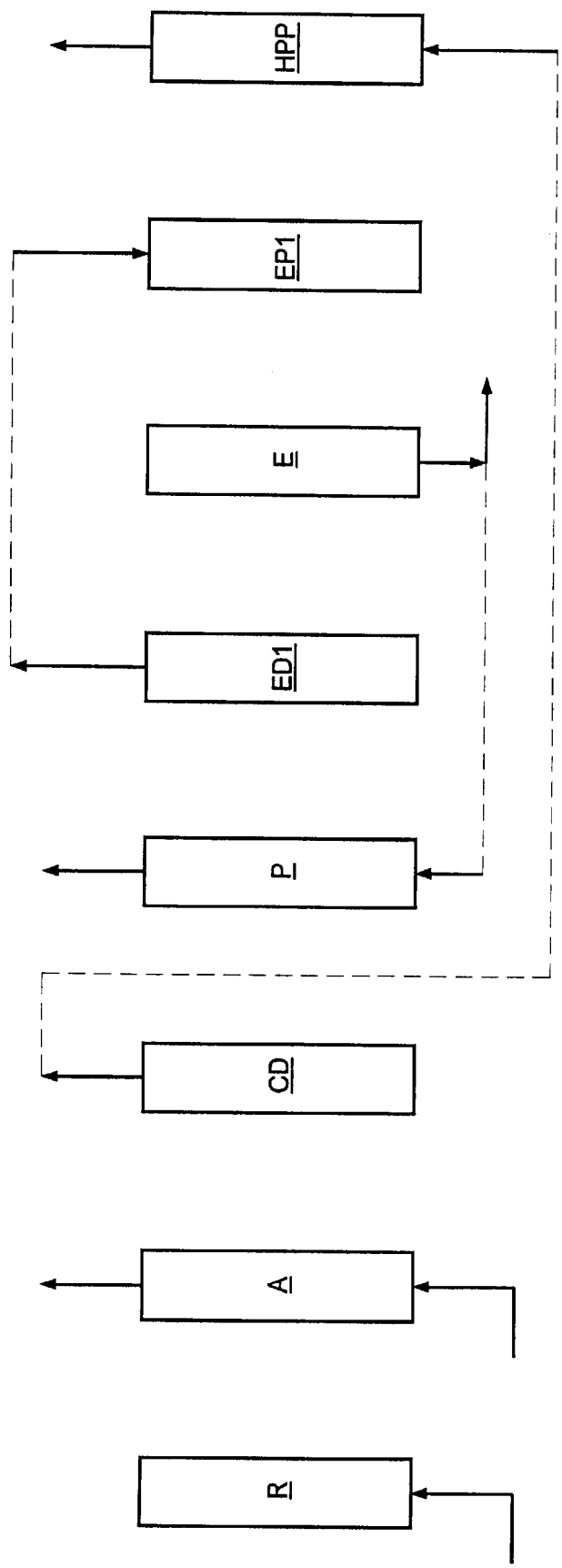
FIG. 7 illustrates a variation of the embodiment illustrated in FIG. 1 in which an adsorbent purge step follows the equalization repressurization step.

The process of FIG. 7 is a modification of the FIG. 1 process. The FIG. 7 process includes a cocurrent purge step, which is referred to as HPP (high pressure purge) to indicate that it is conducted at a higher pressure than purge step P. Step HPP serves to recover some of the strongly adsorbed gas component that is normally lost in step CD, by purging the adsorption vessel after step EP1 with the step CD effluent. The regenerated adsorbent will adsorb some of the strongly adsorbed component in the step CD effluent, thus enhancing recovery of strongly adsorbed component from the feed gas mixture.

Figure 8:
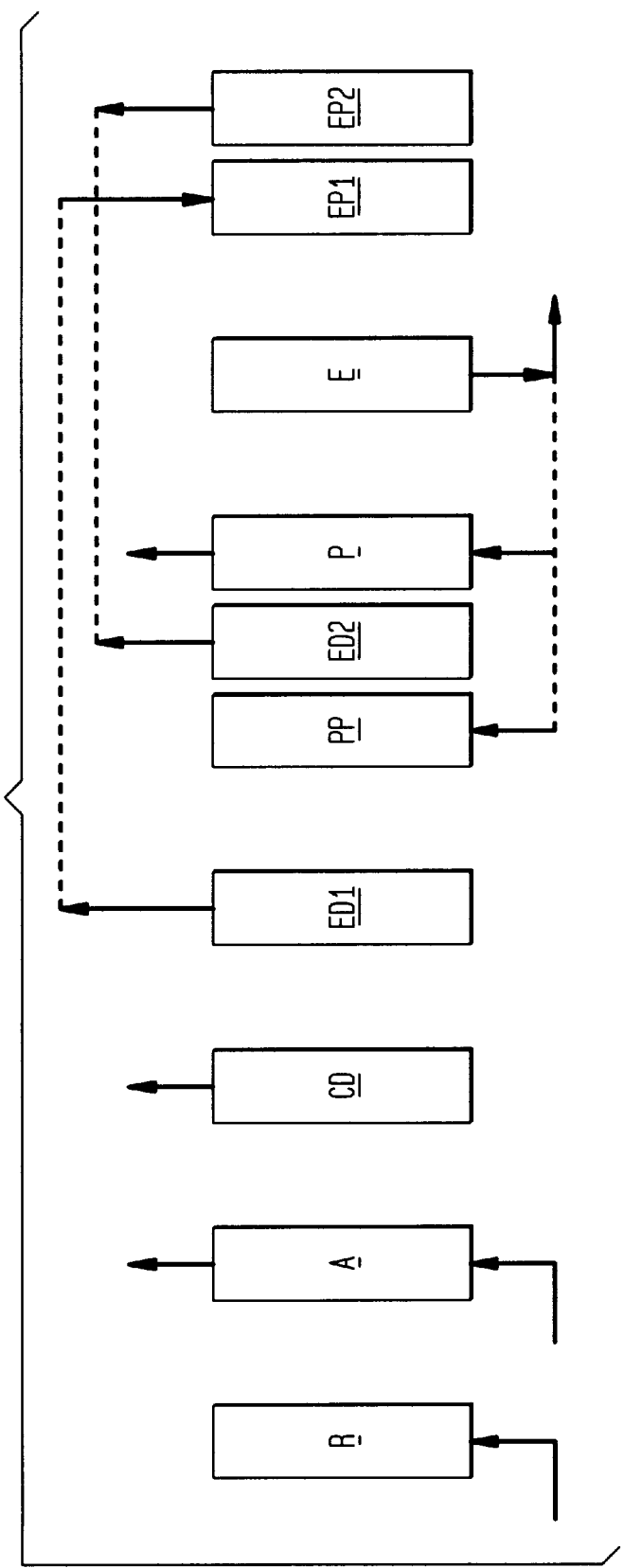
FIG. 8 illustrates a variation of the embodiment illustrated in FIG. 5, having a pressurization step after the equalization depressurization step.

The process illustrated in FIG. 8 is a modification of the FIG. 2 process. The modified process includes a pre-purge pressurization step (PP) between step ED2 and purge step P, during which the pressure in the adsorption vessel is raised by introducing thereinto strongly adsorbed gas product removed from the adsorption vessel during step E. This step increases the concentration of strongly adsorbed gas component in the adsorption vessel and causes additional nonadsorbed or weakly adsorbed gas component to be desorbed from the adsorbent. Because of this more nonadsorbed gas component will be purged from the adsorption vessel during step P.

Figure 9:
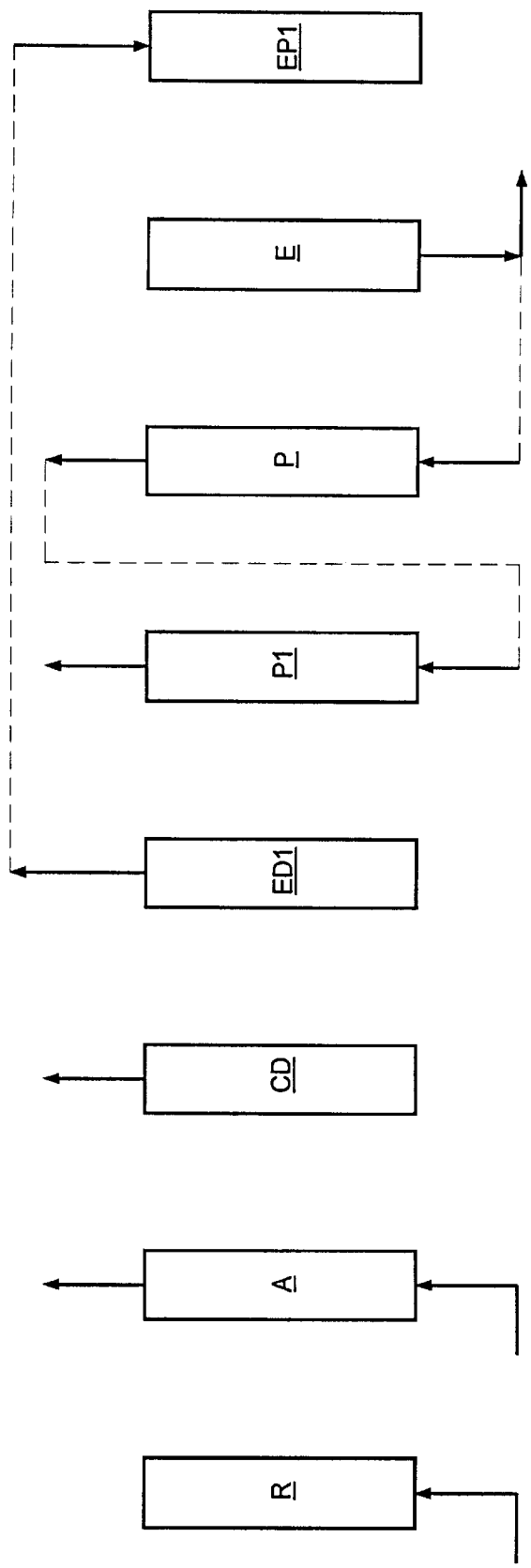
FIG. 9 illustrates a variation of the embodiment illustrated in FIG. 4, having two cocurrent purge steps after the equalization depressurization step.

FIG. 9 illustrates another modification of the process of the invention. Although the FIG. 9 embodiment is illustrated as a modification of the process of FIG. 2, this embodiment can also be applied to the process of FIG. 1. The effect of this embodiment is to increase the duration of the purge step, thereby enhancing the purity of the strongly adsorbed product.

It will be appreciated that it is within the scope of the present invention to utilize conventional equipment to monitor and automatically regulate the flow of gases within the system so that it can be fully automated to run continuously in an efficient manner.

The Table illustrates a preferred embodiment of the invention in which four adsorption vessels, vessels B1 to B4, are operated in parallel and 90° out of phase, and a single vacuum pump is used for all evacuation steps of the process. The adsorption cycle includes the eleven steps of the preferred cycle described above and illustrated in FIG. 2. Referring to the Table and to FIG. 2, the steps of the cycle are: adsorption (AD), step 2; cocurrent depressurization (CO), step 3; cocurrent depressurization to purge (CP), step 4; first purge (P1), step 5; first evacuation (E1), step 6; adsorption/purge (AP), step 7; second purge (P2), step 8; third purge (P3), step 9; fourth purge (P4), step 10; second evacuation (E2), step 11; and repressurization (RP), step 1. It can be readily observed that the vacuum pump (used in steps E1 and E2) is in continuous service throughout the cycle contemplated. For example, steps other than those illustrated in the drawings can be included in the process of the invention. The scope of the invention is limited only by the breadth of the appended claims.

What is claimed is:

1. In a pressure swing adsorption process for producing second component-enriched gas from a gas mixture containing first and second components in at least one adsorption zone containing an adsorbent which selectively adsorbs said second component, comprising repeatedly performing in each adsorption zone the following sequence of steps:

(a) pressurizing said adsorption zone to a selected adsorption pressure;

(b) cocurrently introducing said gas mixture into said adsorption zone at said selected adsorption pressure while cocurrently removing first component-enriched gas therefrom;

(c) purging said adsorption zone by cocurrently introducing thereinto second component-enriched gas produced in step (d), while cocurrently removing purge effluent therefrom; and (d) depressurizing said adsorption zone by countercurrently removing said second component-enriched gas therefrom;

the improvement comprising a first additional step comprising removing a first equalization effluent from said adsorption zone between steps (c) and (d) and a second additional step comprising reintroducing said first equalization effluent into said adsorption zone between step (d) of one cycle of said process and step (a) of the following cycle of the process.

2. The improved process of claim 1, further comprising, between steps (b) and (c), the step of partially depressurizing said adsorption zone, by cocurrently removing second component-depleted gas therefrom.

3. The improved process of claim 1, further comprising a third additional step comprising removing a second equalization effluent from said adsorption zone between steps (b) and (c), and a fourth additional step comprising reintroducing said second equalization effluent into said adsorption zone between the second additional step of one cycle of said process and step (a) of the following cycle of the process.

4. The improved process of claim 3, further comprising, between said third additional step and step (c), the step of partially depressurizing said adsorption zone by cocurrently removing second component-depleted gas therefrom.

5. The improved process of claim 3, further comprising, between step (b) and said third additional step, the step of partially depressurizing said adsorption zone by cocurrently removing second component-depleted gas therefrom.

6. The improved process of claim 5, further comprising a fifth additional step comprising removing a third equalization effluent from said adsorption zone between step (b) and said step of partially depressurizing said adsorption zone, and a sixth additional step comprising reintroducing said

TABLE

| B1 | A   |    |    | ED3 | CD | P | ED1 | E   |    |   | EP1 | EP3 | R  |   |     |
| --- | --- | -- | -- | --- | -- | - | --- | --- | -- | - | --- | --- | -- | - | --- |
| B2 | EP3 | R  |    | A   |    |   |     | ED3 | CD | P | ED1 | E   |    |   | EP1 |
| B3 | E   |    | EP1| EP3 | R  |   |     | A   |    |   |     | ED3 | CD | P | ED1 |
| B4 | ED3 | CD | P  | ED1 | E  |   |     | EP1 | EP3| R |     | A   |    |   |     |

Although the invention has been described with particular reference to specific equipment arrangements, these features are merely exemplary of the invention and variations are third equalization effluent into said adsorption zone between the fourth additional step of one cycle of said process and step (a) of the following cycle of the process.

7. The improved process of claim 6, wherein during said fifth additional step said third equalization effluent is cocurrently removed from said adsorption zone.

8. The improved process of claim 7, wherein during said sixth additional step said third equalization effluent is countercurrently reintroduced into said adsorption zone.

9. The improved process of claim 6, further comprising cocurrently purging said adsorption zone with said second component-depleted gas between said second additional step and said fourth additional step, between said fourth additional step and said sixth additional step or between the sixth additional step of one cycle of the process and step (a) of the following cycle of the process.

10. The improved process of any one of claims 1, 3 or 6, further comprising cocurrently purging said adsorption zone with said purge effluent immediately prior to step (c).

11. The improved process of any one of claims 1, 3 or 6, wherein during step (d) the pressure in said adsorption zone is reduced to about 0.1 to about 5 bara.

12. The improved process of claim 11, wherein said selected adsorption pressure is about 1 to about 20 bara.

13. The improved process of claim 12, wherein during step (d) said adsorption vessel is countercurrently evacuated to subatmospheric pressure.

14. The improved process as claimed in claim 1 wherein said at least one adsorption zone comprises a plurality of adsorption vessels arranged in parallel and operated out of phase.

15. The improved process of claim 14 wherein said plurality of adsorption vessels comprises four adsorption vessels.

16. In a pressure swing adsorption process for producing second component-enriched gas from a gas mixture containing first and second components in at least one adsorption zone containing an adsorbent which selectively adsorbs said second component, comprising repeatedly performing in each adsorption zone the following sequence of steps:

(a) pressurizing said adsorption zone to a selected adsorption pressure;

(b) cocurrently introducing said gas mixture into said adsorption zone at said selected adsorption pressure while cocurrently removing first component-enriched gas therefrom;

(c) partially depressurizing said adsorption zone by cocurrently removing second component-depleted gas therefrom;

(d) purging the partially depressurized adsorption zone by cocurrently introducing thereinto second component-enriched gas produced in step (e), while cocurrently removing purge effluent therefrom; and (e) further depressurizing said adsorption zone by countercurrently removing second component-enriched gas therefrom;

the improvement comprising a first additional step comprising removing a first equalization effluent stream from said adsorption zone between steps (c) and (d) and a second additional step comprising introducing said first equalization effluent into said adsorption zone between step (e) of one cycle of said process and step (a) of the following cycle of the process.

17. The improved process of claim 1 or claim 16, wherein during said first additional step said first equalization effluent is removed from said adsorption zone cocurrently.

18. The improved process of claim 17, wherein during said second additional step said first equalization effluent is reintroduced into said adsorption zone countercurrently.

19. The improved process of claim 2 or claim 16, further comprising cocurrently purging said adsorption zone with said second component-depleted gas between the second additional step of one cycle of the process and step (a) of the following cycle of the process.

20. The improved process of claim 16, further comprising a third additional step comprising removing a second equalization effluent gas from said adsorption zone between steps (b) and (c), thereby producing a second equalization effluent, and a fourth additional step comprising introducing said second equalization effluent into said adsorption zone between said second additional step of one cycle of said process and step (a) of the following cycle of the process.

21. The improved process of claim 3 or claim 20, wherein during said third additional step said second equalization effluent is removed from said adsorption zone cocurrently.

22. The improved process of claim 21, wherein during said fourth additional step said second equalization effluent is reintroduced into said adsorption zone countercurrently.

23. The improved process of any one of claims 4, 5 or 20, further comprising cocurrently purging said adsorption zone with said second component-depleted gas between said second additional step and said fourth additional step or between the fourth additional step of one cycle of the process and step (a) of the following cycle of the process.

24. The improved process of claim 16 or claim 20, further comprising pressurizing said adsorption zone by cocurrently introducing second component-enriched gas into said adsorption zone between said first additional step and step (d).

25. The improved process of claim 16 or claim 20, further comprising cocurrently purging said adsorption zone with said purge effluent immediately prior to step (d).

26. The improved process of any one of claims 1, 3, 6, 16 or 20 wherein said selected adsorption pressure is in the range of about 0.5 to about 50 bara.

27. The improved process of claim 26, wherein said second component is carbon monoxide.

28. The improved process of claim 27, wherein said first component is hydrogen, carbon dioxide, nitrogen or mixtures of these.

29. The improved process of claim 16 or claim 20, wherein during step (e) the pressure in said adsorption zone is reduced to about 0.1 to about 5 bara.

30. The improved process of claim 29, wherein said selected adsorption pressure is about 1 to about 20 bara.

31. The improved process of claim 30, wherein during step (e) said adsorption vessel is countercurrently evacuated to subatmospheric pressure.

* * * * *